(12) United States Patent  
Tanabe

(10) Patent No.: US 12,433,637 B2  
(45) Date of Patent: Oct. 7, 2025

(54) IMPLANT INSERTION DEVICE

(71) Applicant: TERUMO KABUSHIKI KAISHA, Tokyo (JP)

(72) Inventor: Hidenori Tanabe, Naka-gun (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 595 days.

(21) Appl. No.: 17/474,970

(22) Filed: Sep. 14, 2021

(65) Prior Publication Data

US 2021/0401461 A1 Dec. 30, 2021

Related U.S. Application Data

(63) Continuation of application No. PCT/JP2020/006452, filed on Feb. 19, 2020.

(30) Foreign Application Priority Data

Mar. 18, 2019 (JP) .................................. 2019-049245

(51) Int. Cl.  
 A61B 17/34 (2006.01)

(52) U.S. Cl.  
 CPC ...... *A61B 17/3468* (2013.01); *A61B 17/3417* (2013.01); *A61B 17/3496* (2013.01)

(58) Field of Classification Search  
 CPC ............ A61B 17/3468; A61B 17/3417; A61B 17/3496  
 See application file for complete search history.

(56) References Cited

U.S. PATENT DOCUMENTS

| 6,450,937 B1 | 9/2002 | Mercereau et al. |
| 2013/0123767 A1* | 5/2013 | Clark, III ....... A61B 17/320016 606/171 |
| 2015/0148591 A1* | 5/2015 | Joshi ..................... A61F 2/0045 600/37 |
| 2015/0202408 A1 | 7/2015 | Mcmurtry et al. |
| 2017/0049972 A1 | 2/2017 | Persons |
| 2017/0056124 A1 | 3/2017 | Clancy et al. |

(Continued)

FOREIGN PATENT DOCUMENTS

| JP | 2012-500203 A | 1/2012 |
| JP | 2013-027489 A | 2/2013 |
| JP | 2017-099842 A | 6/2017 |

(Continued)

OTHER PUBLICATIONS

Written Opinion of the International Search Authority, dated Apr. 21, 2020, issued in corresponding International Application No. PCT/JP2020/006452 (6 pages).

(Continued)

*Primary Examiner* — Sarah A Long  
*Assistant Examiner* — James R McGinnity  
(74) *Attorney, Agent, or Firm* — Foley & Lardner LLP

(57) ABSTRACT

An implant insertion device includes: an introduction needle having a needle tip that is insertable into subcutaneous tissue; an elongated implant configured to promote tissue regeneration by attachment of cells; and a tubular implant cover that covers an outer side of the introduction needle. A space extending in an axial direction is located between the implant cover and the introduction needle, and the implant is arranged in the space.

19 Claims, 15 Drawing Sheets

(56) References Cited

U.S. PATENT DOCUMENTS

2019/0060642 A1\* 2/2019 Boggs, II ............. A61N 1/0502

FOREIGN PATENT DOCUMENTS

| JP | 2021-502879 A | 2/2021 |
|----|---------------|--------|
| KR | 101878258 B1 | 8/2018 |
| WO | WO-2010/019625 A2 | 2/2010 |

OTHER PUBLICATIONS

Japanese Office Action issued in connection with JP Appl. Ser. No. 2021-507116 dated Jun. 5, 2023.

International Searching Authority, "International Search Report," issued in connection with International Patent Application No. PCT/JP2020/006452, dated Apr. 21, 2020.

International Searching Authority, "Written Opinion," issued in connection with International Patent Application No. PCT/JP2020/006452, dated Apr. 21, 2020.

\* cited by examiner

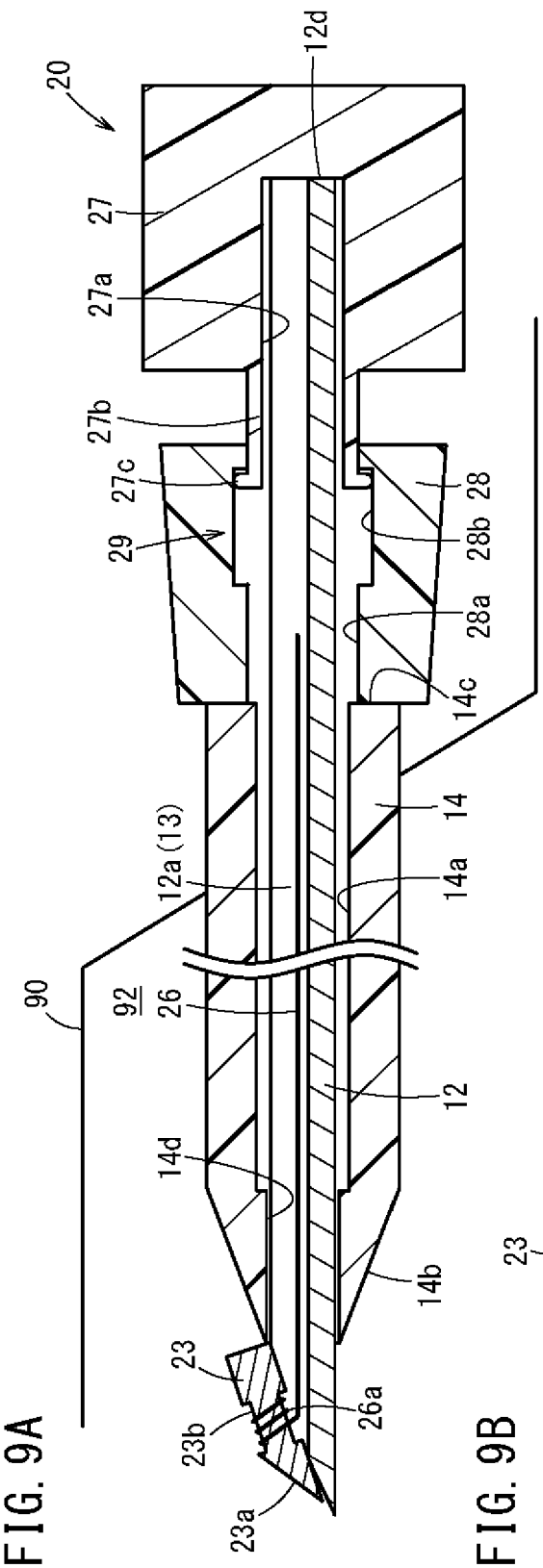
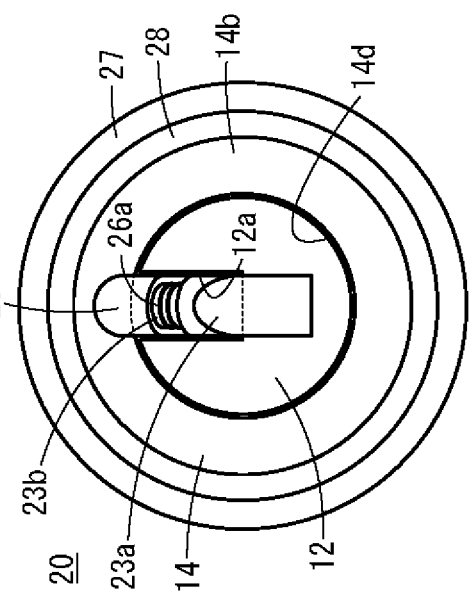
FIG. 9A
FIG. 9B

IMPLANT INSERTION DEVICE

CROSS REFERENCE TO RELATED APPLICATIONS

This is a bypass continuation of PCT Application No. PCT/JP2020/006452, filed on Feb. 19, 2020, which claims priority to Japanese Application No. 2019-049245, filed on Mar. 18, 2019. The contents of these application are hereby incorporated by reference in their entireties.

BACKGROUND

The present invention relates to an implant insertion device that punctures a skin and places an implant to be implanted in a body.

In order to treat a tissue of which function has deteriorated, various treatment methods for implanting an implant that promotes tissue regeneration at such a site have been proposed. For example, there is proposed a method for implanting a porous collagen fiber, which has numerous pores formed inside, in a damaged site (JP 2012-500203 A). If such a collagen fiber is implanted, there is an effect of gathering cells around the fiber and promoting regeneration of damaged tissue.

SUMMARY

In general, the implant is implanted by a method of incising skin tissue to expose the damaged tissue and fixing the collagen fiber to be implanted to the damaged tissue with a ligature clip or a tissue adhesive. However, such a method is highly invasive and has great burden on a patient, and thus, there is a demand for a method with less burden.

Therefore, one aspect of the present invention aims to provide an implant insertion device suitable for implanting an implant having an ability to promote tissue regeneration in a damaged tissue.

One aspect of the present invention is an implant insertion device including: an introduction needle having a needle tip that can be inserted into subcutaneous tissue; an elongated implant that has an ability to promote tissue regeneration by attachment of cells; and a tubular implant cover that covers an outer side of the introduction needle. A space extending in the axial direction is provided between the implant cover and the introduction needle, and the implant is arranged in the space.

Another aspect is an implant insertion device including: an introduction needle having a needle tip that can be inserted into subcutaneous tissue; an elongated implant that has an ability to promote tissue regeneration by attachment of cells and has a distal portion provided with an attachment portion that allows attachment to the subcutaneous tissue; and a tubular implant cover that covers an outer side of the introduction needle. The introduction needle can move relative to the implant cover in the axial direction.

With the implant insertion device according to the above aspect, the implant can be transferred to the implanting site while being protected by the implant cover.

BRIEF DESCRIPTION OF DRAWINGS

FIG. 9A is a cross-sectional view illustrating an operation of puncturing and pulling out the implant insertion device of FIG. 8A at a implanting site of subcutaneous tissue, and FIG. 9B is a front view of the implant insertion device of FIG. 9A;

DETAILED DESCRIPTION

Hereinafter, embodiments of the present invention will be described in detail with reference to the accompanying drawings. Note that, in the present specification, a direction from an introduction needle hub 17 to a needle tip 12b of the introduction needle 12 is referred to as a distal side or a distal direction, and an opposite direction thereof is referred to as a proximal side or a proximal direction.

First Embodiment

Figure 1A:
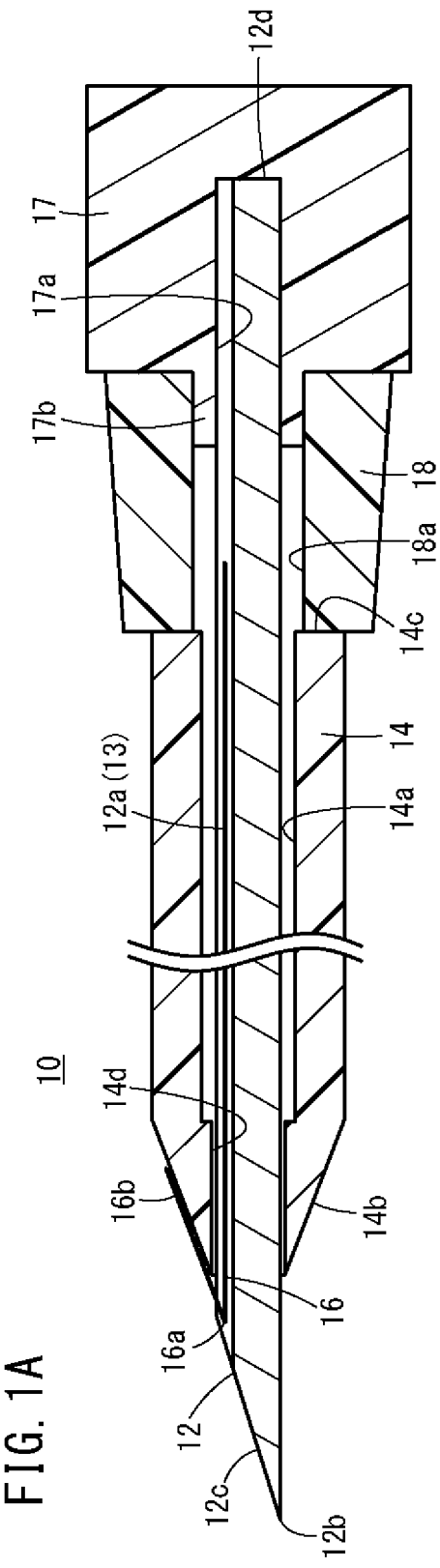
FIG. 1A is a cross-sectional view of an implant insertion device according to a first embodiment.

An implant insertion device 10 according to the present embodiment is used when implanting an implant 16 in a implanting site having a damaged tissue. As illustrated in FIG. 1A, the implant insertion device 10 includes: the introduction needle 12 having the sharp needle tip 12b; an implant cover 14 arranged so as to cover the outer circumference of the introduction needle 12; and the implant 16 accommodated in a space 13 between the introduction needle 12 and the implant cover 14.

Figure 1B:
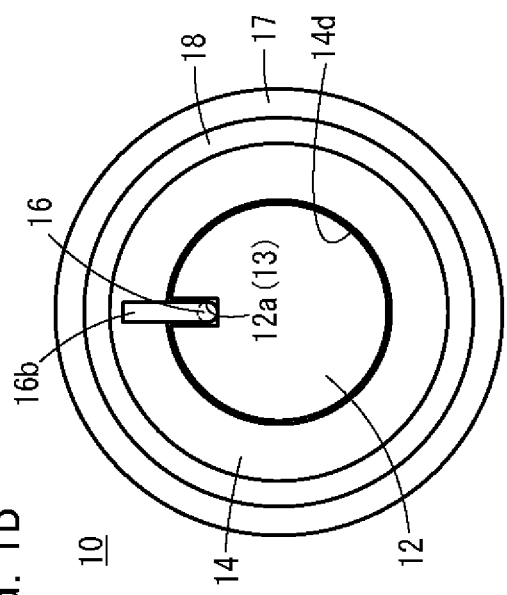
FIG. 1B is a front view of the implant insertion device of FIG. 1A.

The introduction needle 12 is configured as a solid needle. A puncture portion 12c, formed of an inclined surface inclined with respect to the axial direction, is formed in a distal portion of the introduction needle 12, and the sharp needle tip 12b is formed at a distal end of the puncture portion 12c. A groove-shaped recess 12a is formed in an outer peripheral portion of the introduction needle 12. The recess 12a forms the space 13 for accommodating the implant 16 with the implant cover 14. As illustrated in FIG. 1B, the recess 12a is formed to have a width and a depth larger than a diameter of the implant 16 in order to accommodate the implant 16. As illustrated in FIG. 1A, the recess 12a is formed so as to extend in the axial direction from the puncture portion 12c at the distal end of the introduction needle 12 to a proximal portion 12d.

A diameter of the introduction needle 12 can be set to, for example, about 1.6 mm, and the total length thereof can be set to, for example, about 100 mm. Further, the width (length in the circumferential direction) and depth (length in the radial direction) of the recess 12a can be set to, for example, about 0.5 to 0.6 mm.

Examples of a constituent material of the introduction needle 12 include metal materials such as stainless steel, an aluminum alloy, titanium, and a titanium alloy. Further, a marker member containing a heavy element (element having a large atomic number) may be provided in the distal portion of the introduction needle 12 in order to enhance visibility by an X-ray fluoroscope. Further, the outer peripheral portion of the introduction needle 12 may be coated with an antibacterial agent. Furthermore, the distal end of the introduction needle 12 may be processed to be uneven for the purpose of improving visibility by echo.

An introduction needle hub 17 configured to operate the introduction needle 12 is fixed to the proximal portion 12d of the introduction needle 12. The introduction needle hub 17 is configured using a tubular member of which a proximal side is closed, and is formed with an insertion portion 17b to be inserted into a shaft hole 18a of an implant cover hub 18, which will be described later, on the distal side. A needle fixing hole 17a having an inner diameter substantially the same as an outer diameter of the introduction needle 12 is formed at the central portion of the introduction needle hub 17. The needle fixing hole 17a is formed so as to penetrate the insertion portion 17b and extend to the proximal side.

The introduction needle 12 is inserted and fixed in the needle fixing hole 17a of the introduction needle hub 17. The introduction needle hub 17 of the introduction needle 12 can be fixed by, for example, a method such as fitting, caulking, fusion, and bonding with an adhesive.

A resin material can be used as a constituent material of the introduction needle hub 17. Although not particularly limited, the introduction needle hub 17 can be made of various resin materials, for example, polyolefin such as polyethylene, polypropylene, and an ethylene-vinyl acetate copolymer, polyurethane, polyamide, polyester, polycarbonate, polybutadiene, polyvinyl chloride, and polyacetal.

The implant cover 14 is a substantially cylindrical member in which a through-hole 14a extending in the axial direction is formed, and is formed so as to be elongated in the axial direction. The through-hole 14a is formed to have an inner diameter larger than the outer diameter of the introduction needle 12 such that the introduction needle 12 can move smoothly. Further, a distal portion 14b of the through-hole 14a is formed with a reduced-diameter portion 14d reduced to have an inner diameter substantially the same as the outer diameter of the introduction needle 12 in order to suppress rattling of the introduction needle 12. The implant cover 14 can also be called a cylindrical member.

The distal portion 14b of the implant cover 14 is configured of a tapered inclined surface of which outer diameter decreases toward the distal side in order to facilitate puncturing of subcutaneous tissue 92. Note that the distal portion 14b is not limited to the tapered shape, and may be configured of an end surface perpendicular to the axial direction. Further, the distal portion 14b may be configured of a curved surface having a predetermined curvature radius.

The implant cover 14 is configured to cover the periphery of the introduction needle 12 to protect the implant 16 accommodated together with the introduction needle 12. A total length of the implant cover 14 is formed to be shorter than the total length of the introduction needle 12. The implant cover 14 may be formed with an outer diameter of, for example, about 2.1 mm, and an inner diameter of the through-hole 14a may be formed to be, for example, about 1.7 mm. The total length of the implant cover 14 (length from the distal portion 14b to the proximal portion 14c) can be set to, for example, about 100 mm. The implant cover 14 covers the introduction needle 12 and the implant 16 from the distal portion 14b to the proximal portion 14c in the initial state.

The implant cover 14 is preferably formed with appropriate flexibility and elasticity, and a resin material or a metal material can be used as a constituent material of the implant cover 14. Specific examples thereof include metal materials such as stainless steel, an aluminum alloy, titanium, and a titanium alloy, and fluororesins such as PTFE, ETFE, and PFA, olefin resins such as polyethylene and polypropylene, polyurethane, polyester, polyamide, polyether nylon resins, and the like. Note that the whole or a part of the implant cover 14 may contain a heavy element and have a contrast function. Further, the implant cover 14 may be coated with an antibacterial agent. Further, a near-infrared fluorescent dye may be kneaded. Further, an inner surface or the outer surface of the distal end of the implant cover 14 may be processed to be uneven for the purpose of improving visibility by echo.

The proximal portion 14c of the implant cover 14 is provided with the implant cover hub 18 configured to operate the implant cover 14. The proximal portion 14c of the implant cover 14 is fixed to the implant cover hub 18 by, for example, a method such as caulking, fusing, or bonding with an adhesive. The implant cover hub 18 is configured as a substantially cylindrical member having the shaft hole 18a formed at the central portion thereof. The shaft hole 18a communicates with the through-hole 14a of the implant cover 14, and the introduction needle 12 is accommodated therein. An inner diameter of the shaft hole 18a is formed to be substantially the same as an outer diameter of the insertion portion 17b of the introduction needle hub 17. The implant cover hub 18 can be made of the same material as the introduction needle hub 17.

The insertion portion 17b of the introduction needle hub 17 is inserted from the proximal side of the shaft hole 18a, so that the implant cover hub 18 and the introduction needle hub 17 are connected to each other to form an assembled state. In the assembled state, the needle tip 12b of the introduction needle 12 is configured to protrude from the distal end of the implant cover 14 to the distal side by a predetermined length as illustrated in the drawing. Further, the introduction needle hub 17 can be removed from the implant cover hub 18 by pulling out the insertion portion 17b from the shaft hole 18a. The introduction needle 12 can be completely pulled out from the implant cover 14 through the shaft hole 18a by fixing the implant cover hub 18.

The implant 16 is accommodated in the recess 12a (space 13) of the introduction needle 12. The implant 16 is a fibrous member that extends to be long in the axial direction, and is formed of a member in which cells that regenerate a tissue easily gather when being implanted in a damaged tissue in a living body. Examples of such a member include a porous collagen fiber in which numerous micropores are formed in a cross section. As the implant 16, for example, a thread-like one having an average diameter of about 0.4 mm and a length of 100 mm or more can be used. An outer diameter of the implant 16 is smaller than the width and depth of the recess 12a of the introduction needle 12, and the implant 16 is accommodated in the recess 12a without tension.

The implant 16 protrudes from the distal end of the implant cover 14 on the distal side and is folded to the proximal side at a bent portion 16a, and a folded portion 16b on the distal side is arranged along an outer peripheral surface (inclined surface) of the distal portion 14b of the implant cover 14. That is, a part of the distal side of the implant 16 is exposed to the outside of the implant cover 14. The folded portion 16b is configured to engage the subcutaneous tissue 92 (see FIG. 2) to attach the implant 16 at a desired position on the subcutaneous tissue 92.

Note that the implant 16 may be provided with a marker member containing a heavy element (element having a large atomic number) in order to enhance the visibility by the X-ray fluoroscope, or a contrast agent containing a heavy element may be mixed inside a fiber. Further, the implant 16 may contain an antibacterial agent inside or on the outer surface of the fiber. Furthermore, when the implant 16 is used for treatment of lymphadenectomy performed as a part of cancer treatment, an anticancer agent may be contained inside the implant 16.

The implant insertion device 10 according to the present embodiment is configured as described above, and its usage and operational effect will be described hereinafter.

Figure 2:
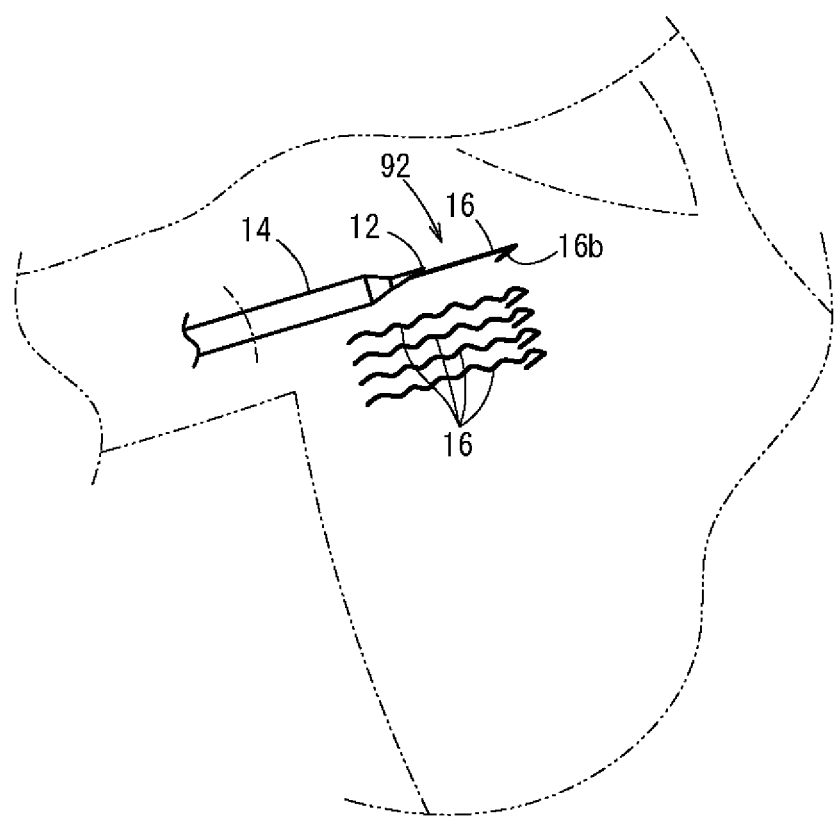
FIG. 2 is an explanatory view illustrating a procedure for implanting an implant in subcutaneous tissue of which function has deteriorated using the implant insertion device of FIG. 1A.

Although the use is not particularly limited, the implant insertion device 10 of the present embodiment can be used in a procedure for implanting the implant 16 in a vicinity of a lymph node having a damaged lymph vessel as illustrated in FIG. 2. The lymphatic vessel is damaged by lymphadenectomy or radiation treatment during tumor treatment. When the lymphatic vessel is damaged and causes dysfunction, edema sometimes occurs because a lymphatic fluid does not flow normally. When implanting the implant 16 made of the collagen fiber in order to improve such dysfunction, cell proliferation and organization can be induced to promote regeneration of the lymphatic vessel. As illustrated in the drawing, a plurality of the implants 16 may be implanted in parallel to more reliably regenerate the lymphatic vessel. Hereinafter, a specific usage of the implant insertion device 10 will be described.

Figure 3:
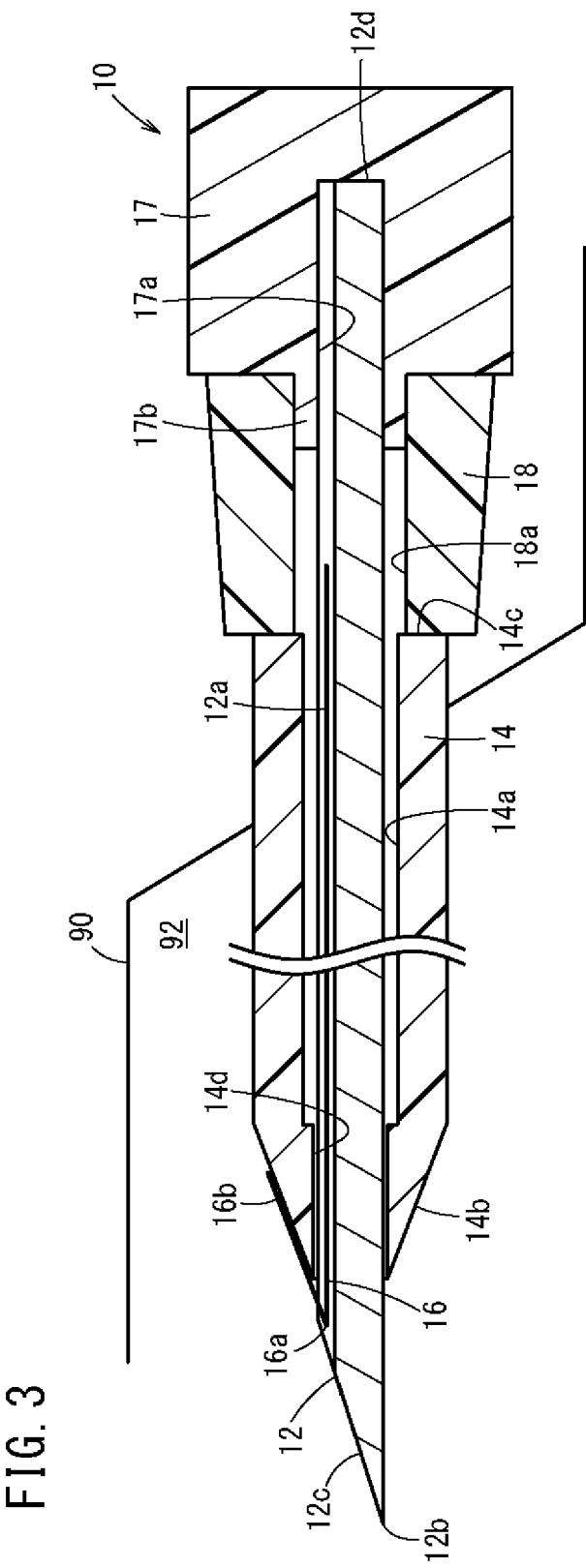
FIG. 3 is a cross-sectional view illustrating a state where a implanting site of the subcutaneous tissue is punctured with the implant insertion device of FIG. 1A.

First, a skin 90 near a implanting site is punctured with the implant insertion device 10 as illustrated in FIG. 3. The puncturing is performed in the assembled state where the introduction needle 12 protrudes from the distal end of the implant cover 14. The sharp needle tip 12b of the introduction needle 12 makes it easy to puncture the skin 90. Thereafter, the introduction needle 12 and the implant cover 14 are advanced in the subcutaneous tissue 92 from the punctured site to the implanting site. The operation of advancing the introduction needle 12 and the implant cover 14 is performed by holding the introduction needle hub 17 with a hand. Because the introduction needle 12 and the implant cover 14 integrally advance, their positions do not change substantially.

The advancement of the introduction needle 12 and the implant cover 14 in the subcutaneous tissue 92 is performed in a state where the implant 16 is accommodated in the recess 12a and covered with the implant cover 14. Therefore, a load such as a pulling force is not applied on the implant 16 covered with the implant cover 14, and it is possible to prevent breakage of a micro-tissue of the implant 16 and deterioration of the cell fixing property.

Figure 4:
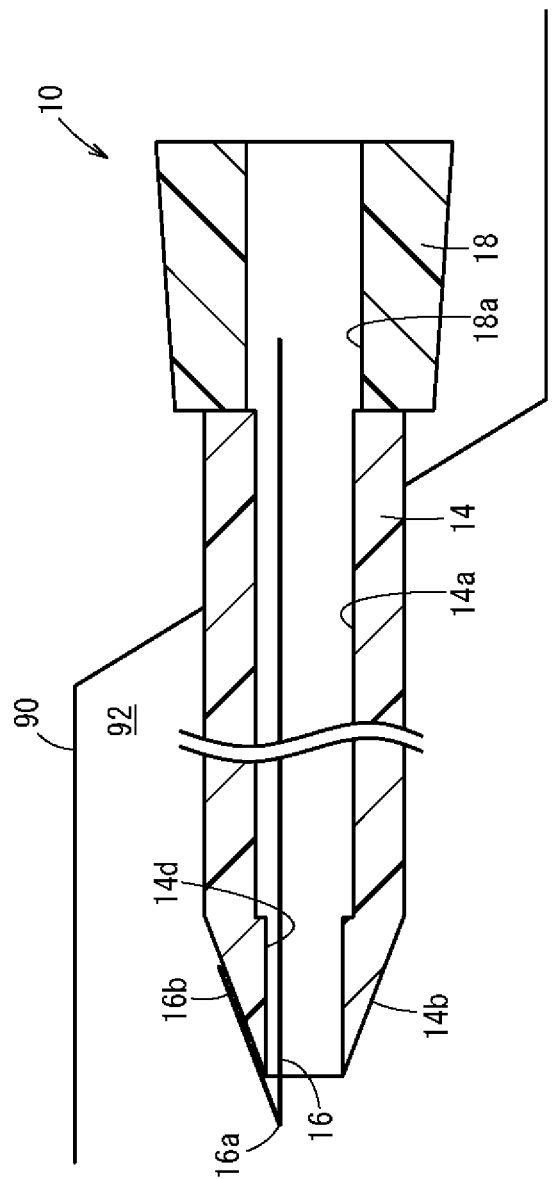
FIG. 4 is a cross-sectional view of a state where an introduction needle is pulled out from the implant insertion device of FIG. 3.

Thereafter, the insertion portion 17b of the introduction needle hub 17 is removed from the implant cover hub 18, and the introduction needle hub 17 is pulled to pull out the introduction needle 12 from the implant cover 14 as illustrated in FIG. 4. Because the folded portion 16b of the implant 16 is caught by the distal portion 14b of the implant cover 14, the implant 16 remains inside the through-hole 14a of the implant cover 14.

Figure 5:
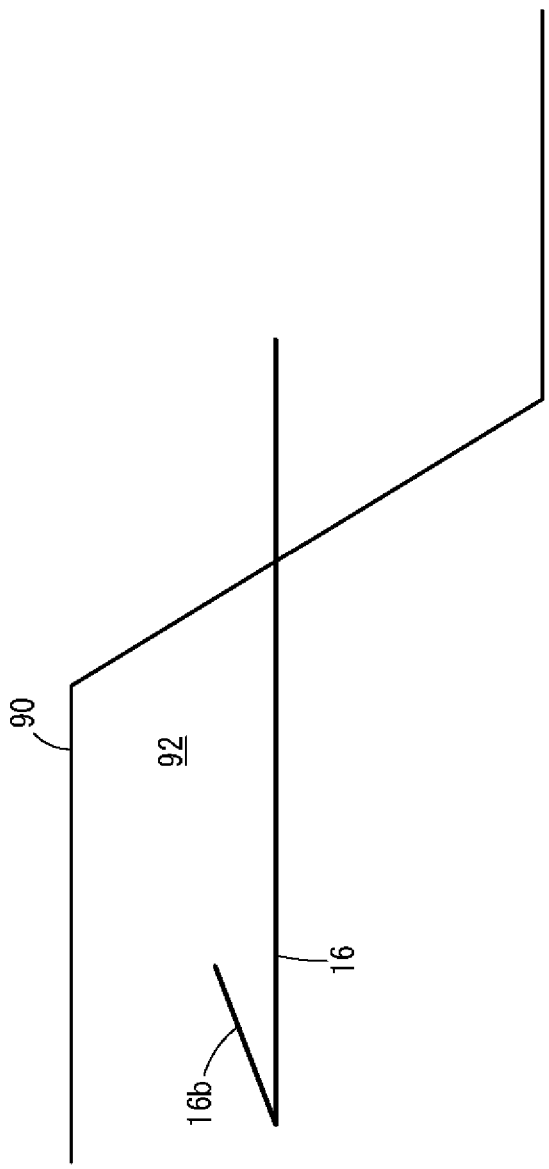
FIG. 5 is a cross-sectional view in a state where the implant cover of FIG. 4 has been pulled out.

Thereafter, the implant cover hub 18 is pulled to pull out the implant cover 14 from the skin 90. At that time, the folded portion 16b at the distal end of the implant 16 is kept in the state of being engaged with the implanting site by being pressed against the subcutaneous tissue 92 as illustrated in FIG. 5. As a result, the implant cover 14 can be pulled out while leaving the implant 16, and the implant 16 can be implanted with a minimum load without applying the pulling force on the implant 16. Thereafter, the implant 16 in a portion protruding from the skin 90 is cut with scissors or the like. With the above operation, the implanting of the implant 16 is completed.

The implant insertion device 10 and the implant 16 of the present embodiment have the following effects.

The implant insertion device 10 described above includes: the introduction needle 12 having the needle tip 12b that can be inserted into the subcutaneous tissue 92; the long implant 16 that has an ability to promote tissue regeneration by attachment of cells; and the tubular implant cover 14 that covers the outer side of the introduction needle 12. The space 13 extending in the axial direction is provided between the implant cover 14 and the introduction needle 12, and the implant 16 is arranged in the space 13. As a result, the implant 16 can be implanted in the subcutaneous tissue 92 without applying a load on the implant 16.

In the implant insertion device 10, the space 13 provided between the implant cover 14 and the introduction needle 12 is formed of the recess 12a that is formed in a groove shape by cutting out a part of the introduction needle 12. As a result, the recess 12a (space 13) capable of accommodating the implant 16 can be formed only by forming the groove in the introduction needle 12. In this case, it is preferable if the introduction needle 12 is the solid needle because the groove-shaped recess 12a can be easily processed.

In the implant insertion device 10, an attachment portion (folded portion 16b) that can attach to the subcutaneous tissue 92 may be provided in the distal portion of the implant 16. Because such an attachment portion (folded portion 16b) is provided, it is possible to prevent the implant 16 from being pulled out together when the implant insertion device 10 is pulled out from the subcutaneous tissue 92. As a result, the implant 16 can be reliably implanted at the implanting site.

In the implant insertion device 10, the attachment portion (folded portion 16b) may have a part on the distal side of the implant 16 protruding to the distal side of the implant cover 14 from the distal portion 14b, and be formed to be folded to the proximal side along the outer surface of the implant cover 14. It is preferable because the attachment portion can be realized only by performing simple processing on the implant 16.

First Modification of First Embodiment

Figure 6:
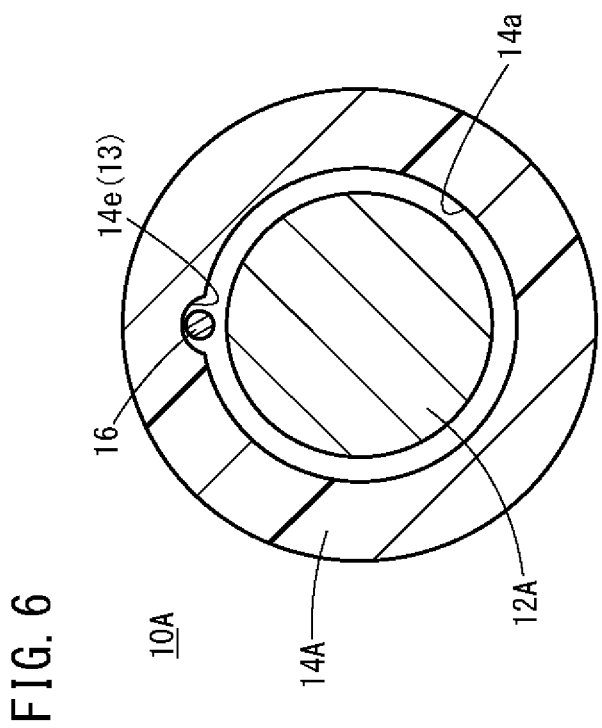
FIG. 6 is a cross-sectional view illustrating an implant insertion device according to a first modification of the first embodiment cut along a plane perpendicular to the axial direction.

As illustrated in FIG. 6, the space 13 for accommodating the implant 16 is provided in an implant cover 14A in an implant insertion device 10A of the present modification. That is, in the implant insertion device 10A of the present embodiment, an introduction needle 12A is configured as a solid needle without the groove-shaped recess 12a while a recess 14e is provided on an inner peripheral surface of the through-hole 14a of the implant cover 14A. Other configurations are the same as those of the implant insertion device 10 illustrated in FIGS. 1A and 1B, the same configurations are denoted by the same reference signs, and detailed descriptions thereof will be omitted.

The groove-shaped recess 14e is formed so as to extend in the axial direction from the distal portion 14b of the implant cover 14A to the proximal portion 14c (see FIG. 1A). The recess 14e is formed to have a width (length in the circumferential direction) and a depth (length in the radial direction) larger than a diameter of the implant 16 so as to be capable of accommodating the implant 16. The width and depth of the recess 14e can be set to, for example, about 0.5 to 0.6 mm. In this case, the recess 14e can accommodate the implant 16 having the diameter of about 0.4 mm.

In this manner, the space 13 between the introduction needle 12A and the implant cover 14A is formed as the groove-shaped recess 14e formed in the implant cover 14A in the implant insertion device 10A according to the present modification. As a result, the same effects as those of the implant insertion device 10 described with reference to FIGS. 1A to 5 can be obtained by the implant insertion device 10A of the present modification. Further, the groove-shaped recess 14e can be formed simultaneously when the implant cover 14A is formed by extrusion molding or the like using a resin material in the present modification. Therefore, the productivity is also excellent.

Note that the present modification is not limited thereto, and the space 13 for accommodating the implant 16 may be formed of both the recess 14e of the implant cover 14A and the recess 12a of the introduction needle 12A.

Second Modification of First Embodiment

Figure 7:
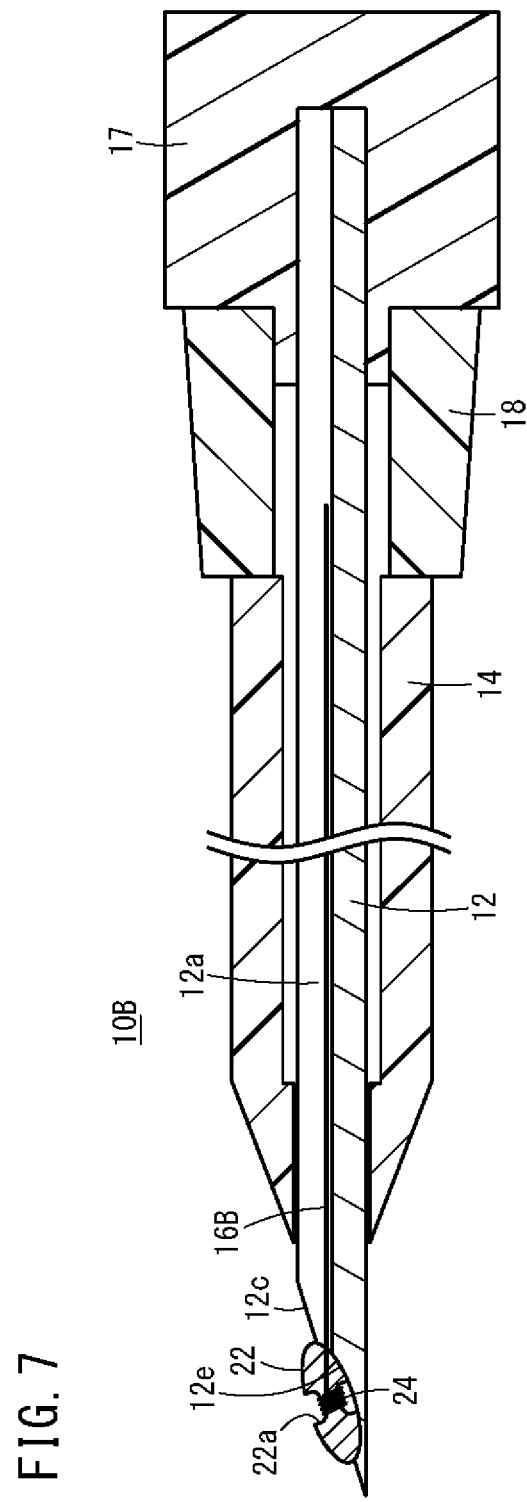
FIG. 7 is a cross-sectional view of an implant insertion device according to a second modification of the first embodiment.

As illustrated in FIG. 7, an implant insertion device 10B according to the present modification is different from the implant insertion device 10 of FIG. 1A in that an attachment portion 22 formed to have a larger diameter than other portions is attached, instead of the folded portion 16b (see FIG. 1A) at a distal end of an implant 16B. Note that, in the implant insertion device 10B, the same configurations as those in the implant insertion device 10 of FIG. 1A are denoted by the same reference signs, and detailed descriptions thereof will be omitted.

As illustrated in the drawing, the attachment portion 22 formed of a biodegradable material is attached to the distal portion of the implant 16B. The attachment portion 22 is formed such that a diameter of a cross section is larger than that of the recess 12a of the introduction needle 12, and is arranged so as to protrude outward from the recess 12a on the distal side of the introduction needle 12. A winding portion 22a formed to be reduced in diameter is formed at the central portion of the attachment portion 22, and a distal portion 24 of the implant 16B is wound and fixed around the winding portion 22a. Furthermore, the attachment portion 22 may be provided to be uneven processing for the purpose of improving visibility by echo. The puncture portion 12c of the introduction needle 12 is provided with a concave surface 12e that accommodates a part of the attachment portion 22 such that the attachment portion 22 does not become a hindrance at during puncturing.

According to the implant insertion device 10B of the present modification, the implant 16B is provided with the attachment portion 22 having a large diameter. Because the attachment portion 22 is arranged so as to protrude to the distal side of the introduction needle 12, the implant 16B is attached to the subcutaneous tissue 92 when the introduction needle 12 is pulled out after puncturing the subcutaneous tissue 92 with the introduction needle 12 and the implant cover 14. As a result, when the introduction needle 12 and the implant cover 14 are pulled out, the implant 16B can be kept in the state of being attached to the subcutaneous tissue 92, and the implant 16B can be reliably implanted at the implanting site.

Second Embodiment

Figure 8A:
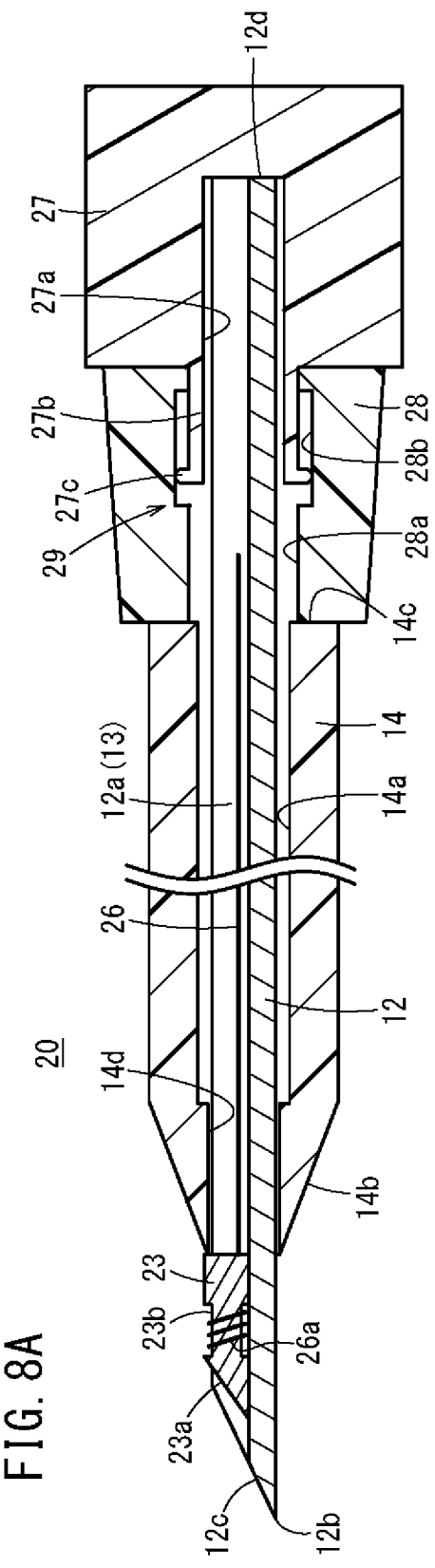
FIG. 8A is a cross-sectional view of an implant insertion device according to a second embodiment.

As illustrated in FIG. 8A, an implant insertion device 20 of the present embodiment is different from the implant insertion device 10 of FIG. 1A in terms of an implant 26, an introduction needle hub 27, and an implant cover hub 28. Note that the same configurations as those in the implant insertion device 10 of FIG. 1A are denoted by the same reference signs, and detailed descriptions thereof will be omitted.

Figure 8B:
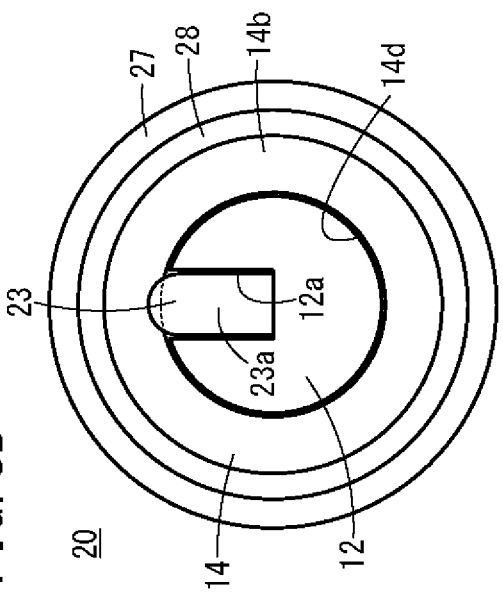
FIG. 8B is a front view of the implant insertion device of FIG. 8A.

As illustrated in FIG. 8A, the implant 26 is provided with an attachment portion 23 formed at a distal end thereof to have a larger diameter than other portions. As illustrated in FIG. 8B, the attachment portion 23 has a width substantially the same as a width of the groove-shaped recess 12a of the introduction needle 12, and most of which is accommodated in the recess 12a in an assembled state. A side portion of the attachment portion 23 is fitted so as to generate frictional resistance with the recess 12a, and is configured such that the attachment portion 23 does not fall off from the recess 12a even if the introduction needle 12 and the implant cover 14 are moved back and forth in the subcutaneous tissue 92.

As illustrated in FIG. 8B, a height of the attachment portion 23 is formed to be higher than a height of the recess 12a, and protrudes outward from an outer peripheral portion of the introduction needle 12. Therefore, an upper end of the attachment portion 23 protrudes outward from the reduced-diameter portion 14d of the implant cover 14 and is configured so as not to pass the reduced-diameter portion 14d. Therefore, the attachment portion 23 is arranged on the distal side of the implant cover 14 in the assembled state as illustrated in FIG. 8A. A distal portion 23a of the attachment portion 23 is configured of an inclined surface that is cut out diagonally so as not to protrude from an inclined surface of the puncture portion 12c of the introduction needle 12, and is arranged at a position retracted to the proximal side from the puncture portion 12c. As a result, the attachment portion 23 is configured so as not to hinder the introduction needle 12 from puncturing the subcutaneous tissue 92. Examples of a material of the attachment portion 23 include biodegradable materials such as polylactic acid (PLA) and polyglycolic acid (PGA). Furthermore, the attachment portion 23 may be provided to be uneven porocessing for the purpose of improving visibility by echo.

A winding portion 23b reduced in diameter is formed at the central portion of the attachment portion 23 in the longitudinal direction. A distal portion 26a of the implant 26 is wound around and fixed to the winding portion 23b. The implant 26 is a thread-like member made of a material having an ability to promote tissue regeneration, which is similar to the implant 16 described with reference to FIG. 1A, and can be formed of a porous collagen fiber, for example.

The introduction needle hub 27 configured to operate the introduction needle 12 is fixed to the proximal portion 12d of the introduction needle 12. The introduction needle hub 27 is formed of a tubular member of which proximal side is closed, and a tubular insertion portion 27b is formed on the distal side. A needle fixing hole 27a having an inner diameter substantially the same as an outer diameter of the introduction needle 12 is formed at the central portion of the introduction needle hub 27 so as to extend in the axial direction.

The introduction needle 12 is inserted and fixed in the needle fixing hole 27a of the introduction needle hub 27. The introduction needle hub 27 of the introduction needle 12 can be fixed by, for example, a method such as fitting, caulking, fusion, and bonding with an adhesive.

The implant cover hub 28 is fixed to the proximal portion 14c of the implant cover 14 by, for example, a method such as caulking, fusion, and bonding with an adhesive. The implant cover hub 28 is configured as a substantially cylindrical member having an insertion hole 28a formed at the central portion thereof. The insertion hole 28a communicates with the through-hole 14a of the implant cover 14, and the introduction needle 12 penetrates the inside thereof. An inner diameter of the insertion hole 28a is formed to be substantially the same as an outer diameter of the insertion portion 27b of the introduction needle hub 27. The implant cover hub 28 can be made of the same material as the introduction needle hub 27.

The insertion hole 28a is formed with a guide recess 28b configured to advance or retract the introduction needle hub 27. The guide recess 28b is formed in a cross-sectional shape in which the insertion hole 28a is enlarged in the radial direction, and has an inner diameter formed to be substantially the same as an outer diameter of a guide protrusion 27c of the insertion portion 27b of the introduction needle hub 27. The guide recess 28b is formed in a range having a predetermined length in the axial direction, and the guide protrusion 27c is configured to be displaceable while sliding in the range where the guide recess 28b is formed. That is, the guide recess 28b and the guide protrusion 27c form an operation mechanism 29 for advancing or retracting the implant cover 14 with respect to the introduction needle 12. In the illustrated example, the guide protrusion 27c is configured to be caught by a proximal portion of the guide recess 28b to stop such that the introduction needle hub 27 is not completely pulled out from the implant cover hub 28. However, the present embodiment is not limited thereto, and the introduction needle hub 27 may be configured to be completely pulled out from the implant cover hub 28.

The implant insertion device 20 is provided as a product in the assembled state where the insertion portion 27b of the introduction needle hub 27 is completely inserted into the insertion hole 28a of the implant cover hub 28. As will be described later, the implant insertion device 20 is used in the assembled state until the implant 26 is implanted in the subcutaneous tissue 92 and pulled out. As illustrated in the drawing, the needle tip 12b of the introduction needle 12 is configured to protrude from the distal end of the implant cover 14 to the distal side by a predetermined length in the assembled state. Further, the attachment portion 23 of the implant 26 is accommodated in the recess 12a of a protruding portion of the introduction needle 12.

The implant insertion device 20 according to the present embodiment is configured as described above, and its usage and operational effect will be described hereinafter.

The implant insertion device 20 is used by puncturing a implanting site in the subcutaneous tissue 92 with the introduction needle 12 and the implant cover 14 in the assembled state illustrated in FIG. 8A. Because most of the attachment portion 23 of the implant 26 is accommodated in the recess 12a of the introduction needle 12 in the implant insertion device 20, it is possible to smoothly perform the puncturing without causing the puncturing of the introduction needle 12 to be disturbed by the attachment portion 23. The attachment portion 23 is fitted in the recess 12a of the introduction needle 12, and thus, does not come off from the recess 12a of the introduction needle 12 even when the introduction needle 12 and the implant cover 14 are pulled to the proximal side. Therefore, it is possible to perform a delicate operation including retraction so as not to damage a blood vessel, a nerve, a ligament, and the like when advancing to the implanting site according to the implant insertion device 20.

Thereafter, an operation of detaching the attachment portion 23 from a distal end of the implant insertion device 20 is performed as illustrated in FIG. 9A. In this case, the introduction needle hub 27 is pulled to the proximal side with respect to the implant cover hub 28. As a result, the guide protrusion 27c slides inside the guide recess 28b of the operation mechanism 29, and the introduction needle hub 27 is pulled out to the proximal side. Then, a distal portion of the introduction needle 12 retracts to the proximal side together with the introduction needle hub 27. The attachment portion 23 protrudes radially outward from the introduction needle 12, and thus, is not retractable into the implant cover 14, and is pushed out from the recess 12a of the introduction needle 12 as illustrated in FIGS. 9A and 9B, so that the attachment portion 23 greatly protrudes to the outer side of the introduction needle 12. As a result, the attachment portion 23 is attached to the subcutaneous tissue 92, and the implant 26 can be implanted in the subcutaneous tissue 92.

Thereafter, the introduction needle hub 27 and the implant cover hub 28 are pulled to the proximal side to pull out the introduction needle 12 and the implant cover 14 from the subcutaneous tissue 92, so that the implant 26 is implanted in the subcutaneous tissue 92.

The implant insertion device 20 of the present embodiment has the following effects.

In the implant insertion device 20 described above, the introduction needle 12 includes the recess 12a (space 13) formed in the groove shape extending in the axial direction by cutting out the introduction needle 12, and the attachment portion 23 is accommodated so as to fit in the recess 12a (space 13). With this configuration, it is possible to prevent the implant 26 from being implanted at an unintended location as the attachment portion 23 is attached to the subcutaneous tissue 92 even when the implant insertion device 20 is pulled.

The implant insertion device 20 is further provided with the operation mechanism 29 that is provided on the implant cover 14 and the proximal portion 12d of the introduction needle 12 and advances or retracts the implant cover 14 with respect to the introduction needle 12. As a result, the attachment portion 23 can be removed from the recess 12a of the introduction needle 12 at a desired implanting site, and the attachment portion 23 can be attached to the subcutaneous tissue 92.

Modification of Second Embodiment

Figures 10A, 10B:
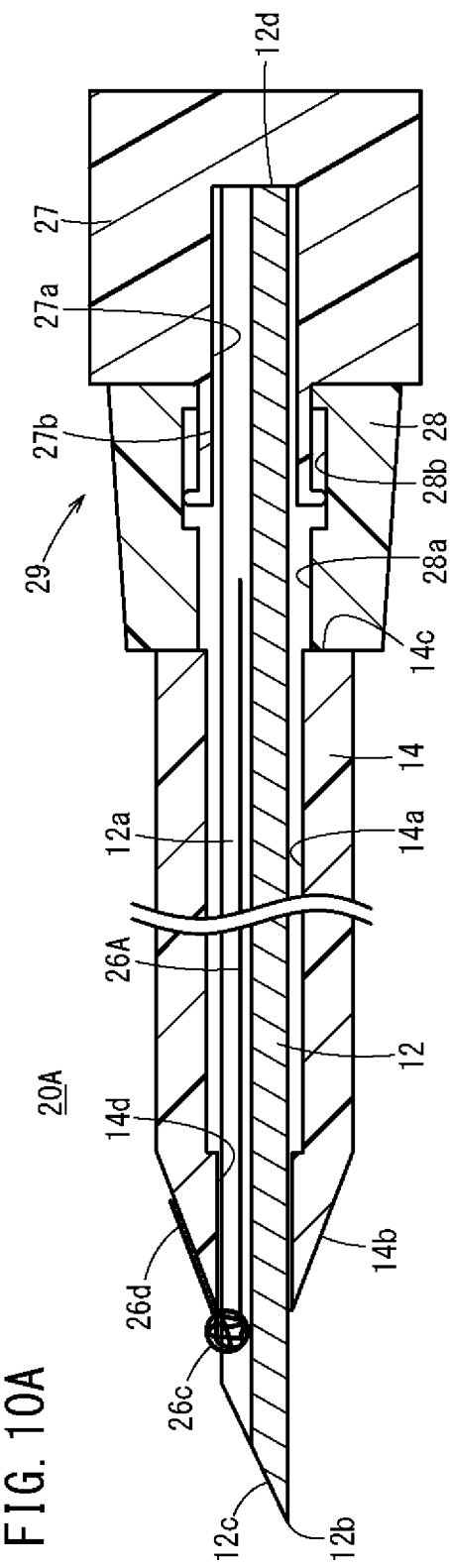
FIG. 10A is a cross-sectional view of an implant insertion device according to a modification of the second embodiment.
FIG. 10B is a front view of the implant insertion device of FIG. 10A.

As illustrated in FIG. 10A, an implant insertion device 20A according to the present modification includes an attachment portion 26c formed in a spherical shape by entwining an implant 26A at a distal end of the implant 26A, instead of the attachment portion 23 (see FIG. 8A). Note that, in the implant insertion device 20A, the same configurations as those in the implant insertion device 20 of FIG. 9A are denoted by the same reference signs, and detailed descriptions thereof will be omitted.

The attachment portion 26c, formed in the spherical shape by entwining the implant 26A, is provided on the distal side of the implant 26A. As illustrated in FIG. 10B, the attachment portion 26c is formed to be larger than a depth of the recess 12a of the introduction needle 12, and is fitted and accommodated in the recess 12a. A distal portion 26d of the implant 26A may protrude from the attachment portion 26c. In this case, the distal portion 26d is folded to the proximal side and arranged along the outer surface of the distal portion 14b of the implant cover 14 as illustrated in FIG. 10A.

Figure 11:
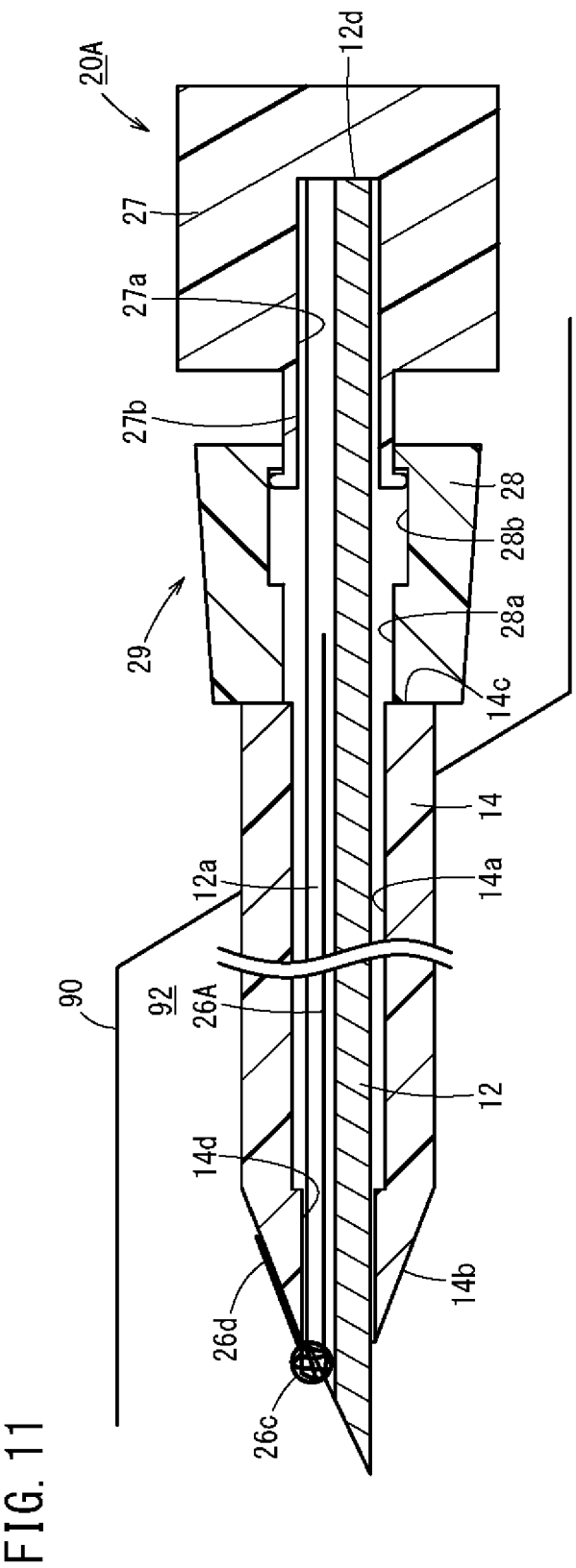
FIG. 11 is a cross-sectional view illustrating an operation of puncturing and pulling out an implant insertion device of FIG. 10A at a implanting site of subcutaneous tissue.

A placement site of the subcutaneous tissue 92 is punctured with the implant insertion device 20A of the present modification in an assembled state illustrated in FIG. 10A. Thereafter, the attachment portion 26c can be detached from the recess 12a of the introduction needle 12 by pulling out the introduction needle hub 27 to the proximal side as illustrated in FIG. 11. As a result, the attachment portion 26c is attached to the subcutaneous tissue 92 so that the implant 26A can be implanted in the subcutaneous tissue 92. Thereafter, the implant 26A can be implanted at the implanting site by pulling out the introduction needle 12 and the implant cover 14 from the subcutaneous tissue 92.

As described above, the implant insertion device 20A of the present modification also has the same effects as the implant insertion device 20 of FIG. 8A.

Third Embodiment

Figure 12A:
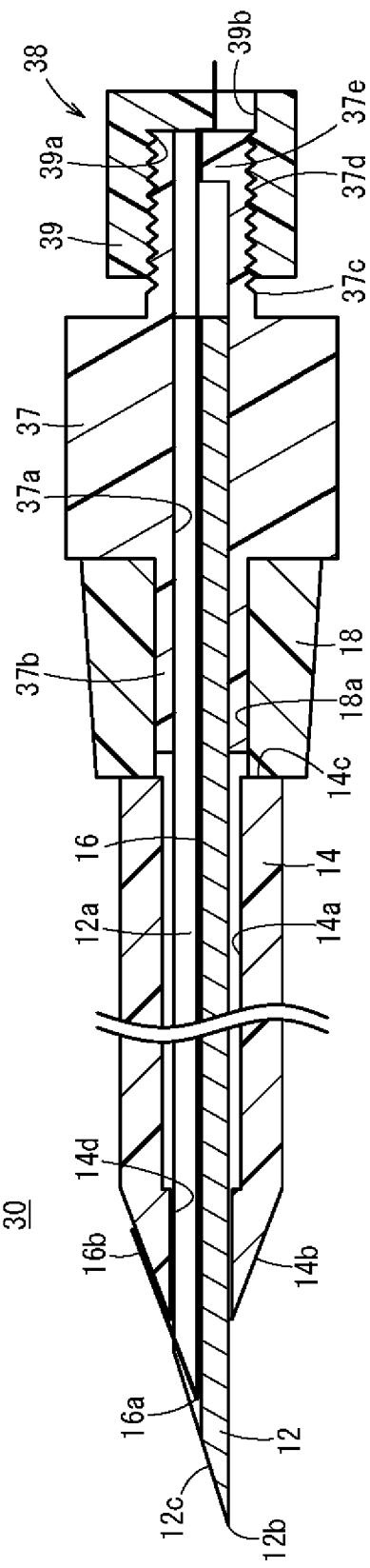
FIG. 12A is a cross-sectional view of an implant insertion device according to a third embodiment.

As illustrated in FIG. 12A, an implant insertion device 30 according to the present embodiment is different from the implant insertion device 10 of FIG. 1A in terms of including an implant holding mechanism 38 that detachably holds a proximal portion of the implant 16 on an introduction needle hub 37. Note that, in the implant insertion device 30, the same configurations as those in the implant insertion device 10 of FIG. 1A are denoted by the same reference signs, and detailed descriptions thereof will be omitted.

The introduction needle hub 37 of the present embodiment is formed with an insertion portion 37b on the distal side that is inserted into the shaft hole 18a of the implant cover hub 18, and is provided with a cap mounting portion 37c on the proximal side that forms a part of the implant holding mechanism 38. At the central portion of the introduction needle hub 37, a needle fixing hole 37a having an inner diameter substantially the same as an outer diameter of the introduction needle 12 is formed so as to penetrate in the axial direction. That is, the needle fixing hole 37a is formed so as to penetrate from a distal end of the insertion portion 37b to a proximal portion of the cap mounting portion 37c.

Figure 12B:
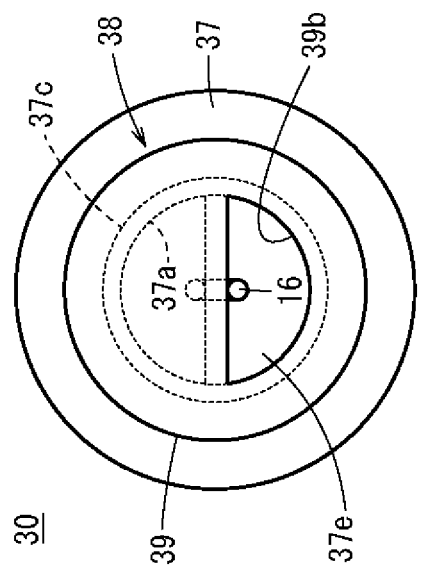
FIG. 12B is a rear view of the implant insertion device of FIG. 12A.

The introduction needle 12 is inserted and fixed in the needle fixing hole 37a. Further, a projecting portion 37e, which protrudes to the inner side of the needle fixing hole 37a in a semicircular shape and closes a substantially half range of the needle fixing hole 37a, is formed at the proximal portion of the cap mounting portion 37c as illustrated in FIG. 12B. A screw mechanism 37d is formed on an outer peripheral portion of the cap mounting portion 37c. As illustrated in FIG. 12A, the cap member 39 is mounted on the cap mounting portion 37c from the outer side.

The cap member 39 is formed in a bottomed cylindrical shape, and a screw mechanism 39a that can be screwed into the screw mechanism 37d of the cap mounting portion 37c is formed on an inner portion thereof. The cap member 39 is screwed into the cap mounting portion 37c through the screw mechanism 39a. A semi-circular opening 39b is formed at a proximal portion of the cap member 39. The cap member 39 is configured to be displaceable between a closed position where the opening 39b is closed by the projecting portion 37e and an open position where the opening 39b communicates with the needle fixing hole 37a by being rotated.

A proximal portion of the implant 16 extends to the proximal side of the implant insertion device 30 through the needle fixing hole 37a and the opening 39b. As illustrated in FIG. 12B, the proximal portion of the implant 16 is sandwiched between the cap member 39 and the projecting portion 37e at the closed position of the cap member 39 so that the implant 16 is fixed to the implant insertion device 30. Further, the implant 16 can be detached from the implant insertion device 30 at the open position of the cap member 39 (see FIG. 13). The cap member 39 is fixed to the closed position in an assembled state of the implant insertion device 30.

Figure 13:
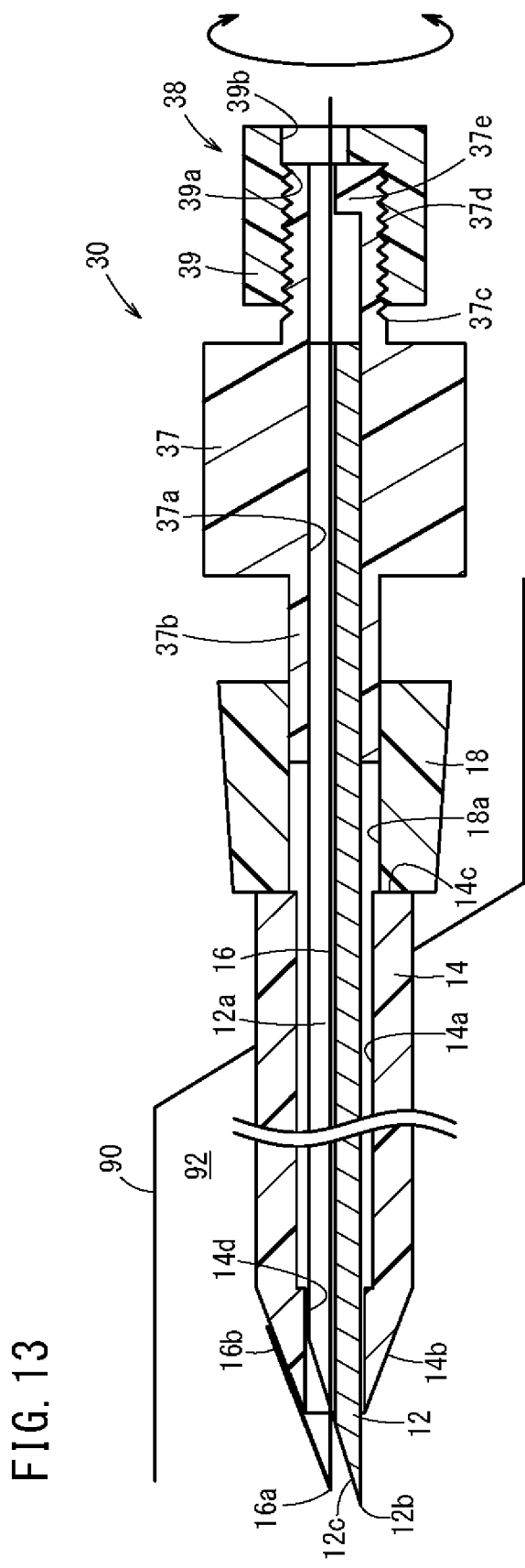
FIG. 13 is a cross-sectional view illustrating an operation of puncturing and pulling out an implant insertion device of FIG. 12A at a implanting site of subcutaneous tissue.

A implanting site in the subcutaneous tissue 92 is punctured with the implant insertion device 30 of the present embodiment in the assembled state illustrated in FIG. 12A. Thereafter, the cap member 39 is rotated to the open position where the opening 39b communicates with the needle fixing hole 37a as illustrated in FIG. 13. As a result, the implant 16 can be detached from the implant insertion device 30.

Thereafter, the introduction needle 12 is pulled out from the subcutaneous tissue 92 as illustrated in the drawing. Furthermore, the implant cover 14 is pulled out from the subcutaneous tissue 92. Then, the implanting of the implant 16 in the subcutaneous tissue 92 is completed by cutting the implant 16 in a portion protruding from the skin 90.

Figure 14A:
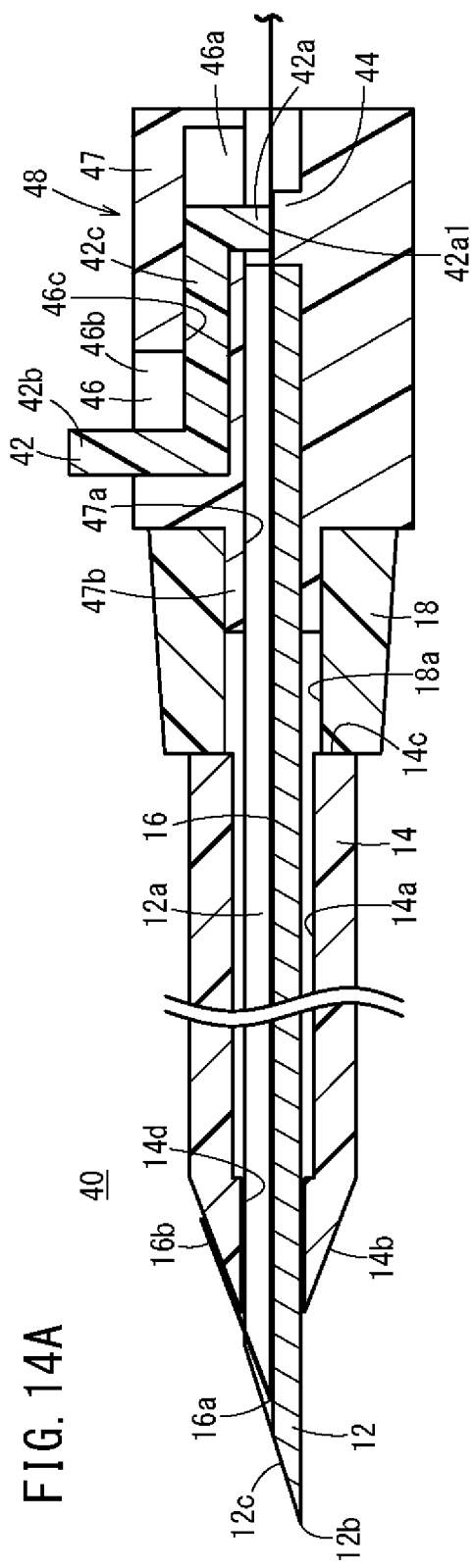
FIG. 14A is a cross-sectional view of an implant insertion device according to a fourth embodiment.

As described above, the implant insertion device 30 of the present embodiment includes the implant holding mechanism 38, which detachably holds the proximal portion of the implant 16, on the proximal side of the introduction needle 12. As a result, the implant 16 can be implanted at a desired position. Further, the implant 16 does not fall off even if the operation of pulling the implant insertion device 30 is performed. Thus, the implant insertion device 30 can be operated freely, and a delicate operation including retraction can be performed so as not to damage a blood vessel, a nerve, a ligament, and the like Fourth Embodiment As illustrated in FIG. 14A, an implant insertion device 40 of the present embodiment is different from the implant insertion device 30 in FIG. 12A in terms of including an implant holding mechanism 48 having an operating lever 42, which is slidable, on an introduction needle hub 47 at a proximal portion of the introduction needle 12. Note that, in the implant insertion device 40, the same configurations as those in the implant insertion device 30 of FIG. 12A are denoted by the same reference signs, and detailed descriptions thereof will be omitted.

The introduction needle hub 47 is formed with an insertion portion 47b, which is inserted into the shaft hole 18a of the implant cover hub 18, on the distal side. At the central portion of the introduction needle hub 47, a needle fixing hole 47a is formed so as to penetrate in the axial direction from the distal side of the insertion portion 47b to the proximal side of the introduction needle hub 47. A proximal portion of the introduction needle 12 is inserted and fixed in the needle fixing hole 47a. Further, a protruding portion 44 protruding from one end side (lower side in the drawing) to the other end side (upper side in the drawing) of the introduction needle hub 47 is formed in a vicinity of a proximal portion of the needle fixing hole 47a. The protruding portion 44 is formed so as to extend to a vicinity of the center of the needle fixing hole 47a, and is formed to have a predetermined length in the axial direction.

Further, a guide hole 46 of which cross section is bent in a crank shape is formed on the other end side of the introduction needle hub 47. The guide hole 46 has one end 46a (lower end) that is open in the needle fixing hole 47a and the other end 46b (upper end) that is open on the other end side of the introduction needle hub 47. The one end 46a and the other end 46b communicate with each other through a connecting portion 46c extending in the axial direction. The one end 46a of the guide hole 46 is formed from a portion facing the protruding portion 44 to a portion on the proximal side of the protruding portion 44, and is formed to be longer than the protruding portion 44 in the axial direction. Further, the other end 46b of the guide hole 46 is formed to have the same length as the one end 46a in the axial direction.

The operating lever 42 bent in the crank shape is inserted into the guide hole 46. The operating lever 42 includes: an intermediate portion 42c that is inserted into the connecting portion 46c of the guide hole 46 and slides in the axial direction; a pressing portion 42a that extends from the proximal side of the intermediate portion 42c to the center side of the introduction needle hub 47; and an operating portion 42b that is bent to the outer side of the introduction needle hub 47 from the distal side of the intermediate portion 42c. The operating portion 42b protrudes to the outer side of the introduction needle hub 47 through the other end 46b of the guide hole 46, and is configured so as to enable a user to input an operating force. The pressing portion 42a includes an abutment surface 42a1 corresponding to an end surface of the protruding portion 44, and is configured to press and fix the proximal portion of the implant 16 between the abutment surface 42a1 and the protruding portion 44.

Figure 14B:
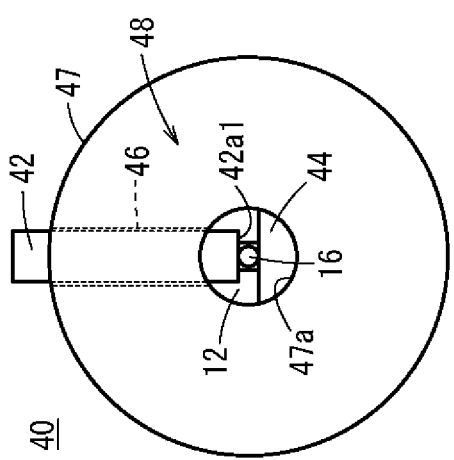
FIG. 14B is a rear view of the implant insertion device of FIG. 14A.

As illustrated in FIG. 14B, a width of the operating lever 42 is formed to be substantially the same as a width of the guide hole 46. It is preferable that a frictional force be generated between the guide hole 46 and the operating lever 42 such that the operating lever 42 does not move at an unintended timing. As illustrated in FIG. 14A, axial lengths of the pressing portion 42a of the operating lever 42 and the introduction needle 12 of the operating portion 42b are formed to be shorter than an axial length of the introduction needle 12 at the one end 46a and the other end 46b of the guide hole 46. As a result, the operating lever 42 is configured to be slidable in the axial direction along the guide hole 46. When the operating lever 42 is located on the distal side, the pressing portion 42a faces the protruding portion 44 and fixes the proximal portion of the implant 16. Further, when the operating lever 42 is moved to the proximal side, the pressing portion 42a comes off from the protruding portion 44, and the fixing of the implant 16 is released.

The insertion portion 47b of the introduction needle hub 47 can be pulled out from the shaft hole 18a of the implant cover hub 18. Note that the implant insertion device 40 is provided as a product in an assembled state where the insertion portion 47b of the introduction needle hub 47 is completely pushed into the shaft hole 18a of the implant cover hub 18 and the operating lever 42 is located on the distal side as illustrated in FIG. 14A.

Figure 15:
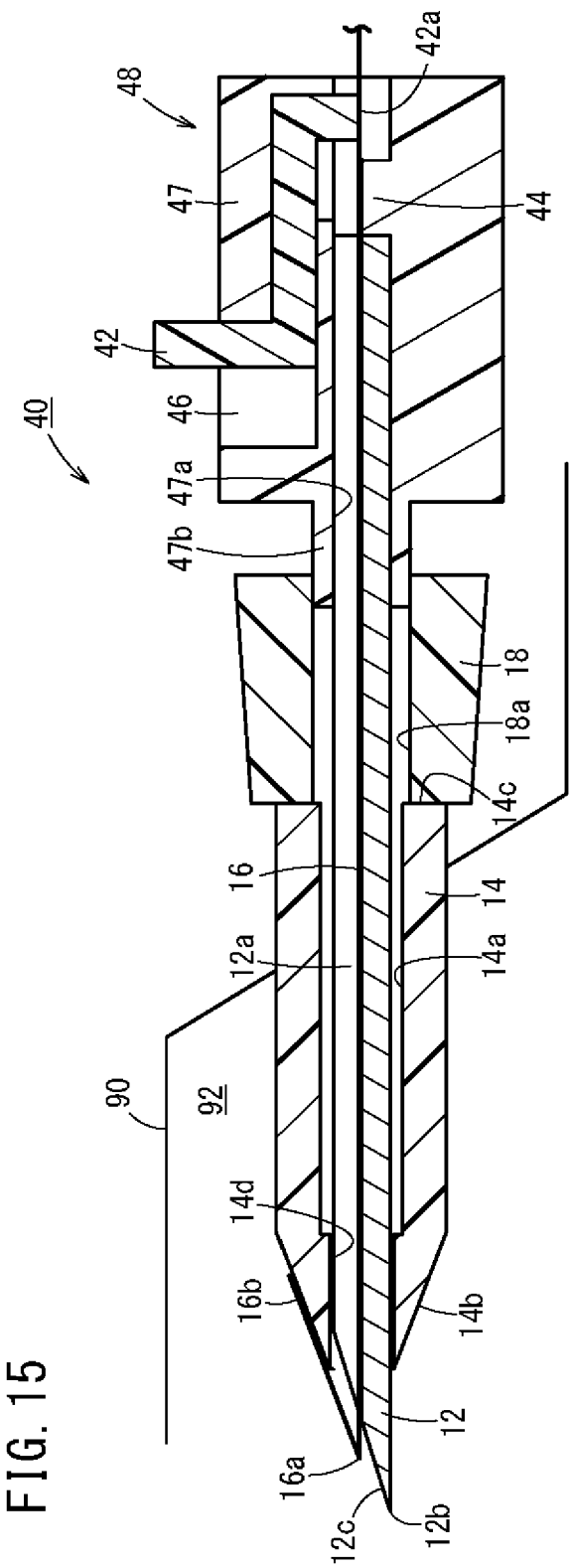
FIG. 15 is a cross-sectional view illustrating an operation of puncturing and pulling out an implant insertion device of FIG. 14A at a implanting site of subcutaneous tissue.

A implanting site in the subcutaneous tissue 92 is punctured with the implant insertion device 40 of the present embodiment in the assembled state illustrated in FIG. 14A. Thereafter, the operating lever 42 is moved to the proximal side, and the pressing portion 42a of the operating lever 42 is removed from the protruding portion 44 as illustrated in FIG. 15. As a result, the fixing of the implant 16 is released, and the implant 16 can be detached from the implant insertion device 40.

Thereafter, the insertion portion 47b of the introduction needle hub 47 is pulled out from the shaft hole 18a of the implant cover hub 18 as illustrated in the drawing. Thereafter, the introduction needle hub 47 is pulled out to pull out the introduction needle 12 from the implant cover 14. Next, the implant cover 14 is pulled out from the subcutaneous tissue 92. As a result, the implant 16 is implanted in the subcutaneous tissue 92. Finally, the implanting of the implant 16 in the subcutaneous tissue 92 is completed by cutting the implant 16 in a portion protruding from the skin 90.

As described above, the implant insertion device 40 of the present embodiment has the same effects as those of the implant insertion device 30 of FIG. 12A.

Although the present invention has been described with the preferred embodiments as above, it is obvious that the present invention is not limited to the above-described embodiments, and various modifications can be made within a scope not departing from a gist of the present invention. For example, the needle tip 12b of the introduction needle 12 may be blunt rather than sharp.

What is claimed is:

1. An implant insertion device comprising:
    an introduction needle comprising a puncture portion formed of an inclined surface that is inclined with respect to an axial direction of the introduction needle, the puncture portion having a sharp needle tip that is insertable into subcutaneous tissue;
    an elongated implant made of collagen fiber, wherein the elongated implant is configured to promote tissue regeneration by attachment of cells; and
    a tubular implant cover that covers an outer side of the introduction needle,
    wherein a space extending in an axial direction is located between the tubular implant cover and the introduction needle, and the elongated implant is arranged in the space, the space comprising a first groove that extends along an entirety of the introduction needle and is a part of the introduction needle.

2. The implant insertion device according to claim 1, wherein the space further comprises a second groove in a part of the tubular implant cover.

3. The implant insertion device according to claim 1, wherein the elongated implant comprises an attachment portion located at a distal portion of the elongated implant and configured to attach to the subcutaneous tissue.

4. The implant insertion device according to claim 3, wherein the attachment portion comprises a part that protrudes to a distal side of a distal portion of the tubular implant cover, and that is folded to a proximal side along an outer peripheral surface of the distal portion of the tubular implant cover and disposed on the outer peripheral surface of the distal portion of the tubular implant cover.

5. The implant insertion device according to claim 3, wherein a diameter of the attachment portion is larger than a diameter of other portions of the elongated implant.

6. The implant insertion device according to claim 5, wherein the attachment portion is fit into the first groove.

7. The implant insertion device according to claim 1, wherein the introduction needle is movable in the axial direction relative to the tubular implant cover.

8. The implant insertion device according to claim 1, further comprising an implant holding mechanism that is located at a proximal portion of the introduction needle and holds a proximal portion of the elongated implant in a detachable manner.

9. The implant insertion device according to claim 1, wherein a distal portion of the tubular implant cover comprises a frustoconical surface having an outer diameter that decreases toward a distal side.

10. The implant insertion device according to claim 9, wherein:
the elongated implant comprises a folded portion at a distal end of the elongated implant, and
a proximal-most tip of the folded portion is positioned on the frustoconical surface of the tubular implant cover.

11. The implant insertion device according to claim 1, wherein a proximal end of the elongated implant is located proximal of a proximal end of the tubular implant cover.

12. An implant insertion device comprising:
an introduction needle comprising a puncture portion formed of an inclined surface that is inclined with respect to an axial direction of the introduction needle, the puncture portion having a sharp needle tip that is insertable into subcutaneous tissue; and
a tubular implant cover that covers an outer side of the introduction needle, wherein a distal portion of the tubular implant cover comprises a frustoconical surface having an outer diameter that decreases toward a distal side of the tubular implant cover;
wherein a space extending in an axial direction is located between the tubular implant cover and the introduction needle, the space being configured to accommodate an elongated implant, the space comprising a first groove that extends along an entirety of the introduction needle as a part of the introduction needle and extends proximally from the inclined surface of the puncture portion.

13. The implant insertion device according to claim 12, wherein:
the elongated implant comprises a folded portion at a distal end of the elongated implant, and
a proximal-most tip of the folded portion is positioned on the frustoconical surface of the tubular implant cover.

14. The implant insertion device according to claim 12, wherein:
the elongated implant comprises an attachment portion located at a distal portion of the elongated implant and configured to attach to the subcutaneous tissue, and
the attachment portion comprises a part that protrudes to the distal side of the distal portion of the tubular implant cover, and that is folded to a proximal side along an outer peripheral surface of the distal portion of the tubular implant cover and disposed on the outer peripheral surface of the distal portion of the tubular implant cover.

15. The implant insertion device according to claim 12, wherein a proximal end of the elongated implant is located proximal of a proximal end of the tubular implant cover.

16. The implant insertion device according to claim 12, wherein the space further comprises a second groove in a part of the tubular implant cover.

17. A method for inserting an elongated implant, the method comprising:
providing an implant insertion device comprising:
an introduction needle comprising a puncture portion formed of an inclined surface that is inclined with respect to an axial direction of the introduction needle, the puncture portion having a sharp needle tip that is insertable into subcutaneous tissue,
an elongated implant made of collagen fiber, the elongated implant configured to promote tissue regeneration by attachment of cells, and
a tubular implant cover that covers an outer side of the introduction needle,
wherein a space extending in an axial direction is located between the tubular implant cover and the introduction needle, and the elongated implant is arranged in the space, wherein the space comprises a groove that extends along an entirety of the introduction needle and is a part of the introduction needle;
puncturing a skin of an individual using the sharp needle tip of the introduction needle and advancing the introduction needle and the tubular implant cover into the subcutaneous tissue; and
pulling the tubular implant cover out from the skin while the elongated implant remains implanted in the subcutaneous tissue.

18. The method according to claim 17, wherein a distal portion of the tubular implant cover comprises a frustoconical surface having an outer diameter that decreases toward a distal side of the tubular implant cover.

19. The method according to claim 18, wherein:
the elongated implant comprises a folded portion at a distal end of the elongated implant, and
a proximal-most tip of the folded portion is positioned on the frustoconical surface of the tubular implant cover when the skin of the individual is punctured.

* * * * *